United States Patent [19]
Solt et al.

[11] Patent Number: 5,790,891
[45] Date of Patent: Aug. 4, 1998

[54] SYNCHRONIZING UNIT HAVING TWO REGISTERS SERIALLY CONNECTED TO ONE CLOCKED ELEMENTS AND A LATCH UNIT FOR ALTERNATELY ACTIVATING THE REGISTERS IN ACCORDANCE TO CLOCK SIGNALS

[75] Inventors: Yosef Solt, Haifa; Doron Shefert, Manof; David Shemla, Kfar Havradim; Eyal Waldman, K. Tivon, all of Israel

[73] Assignee: Galileo Technology Ltd., Karmiel, Israel

[21] Appl. No.: 585,335

[22] Filed: Jan. 11, 1996

[51] Int. Cl.$^6$ ................................... G06F 13/00
[52] U.S. Cl. .............. 395/854; 395/557; 395/849; 395/877; 395/880; 327/144; 327/151; 327/153; 327/160
[58] Field of Search .............. 327/99, 151, 144, 327/153, 160; 341/77; 364/785; 370/396; 365/230.03; 375/222, 376; 371/21.2; 395/880, 557, 849, 854, 877

[56] References Cited

U.S. PATENT DOCUMENTS

| | | | |
|---|---|---|---|
| 3,633,115 | 1/1972 | Epstein | 327/151 |
| 4,128,832 | 12/1978 | Betts | 341/77 |
| 4,285,047 | 8/1981 | Ohnishi | 364/785 |
| 4,463,443 | 7/1984 | Frankel et al. | 395/880 |
| 4,926,424 | 5/1990 | Maeno | 371/21.2 |
| 5,093,809 | 3/1992 | Schmitt-Landsiedel et al. | 365/230.03 |
| 5,130,976 | 7/1992 | Hickey et al. | 370/396 |
| 5,278,865 | 1/1994 | Amrany et al. | 375/222 |
| 5,299,237 | 3/1994 | Head | 375/376 |
| 5,587,675 | 12/1996 | Schmitt | 327/99 |

OTHER PUBLICATIONS

"Gray Code Counter", IBM Technical Disclosure Bulletin, p.824, Sep. 1970.
"Modified Gray Code Counters", IBM Technical Disclosure Bulletin, pp.460–462, Jul. 1980.
"Modular Buffer Allocation Control Logic", IBM Technical Disclosure Bulletin, pp.6240–6243, May 1982.
"High Speed On–Chip Addressable Memory Clock", IBM Technical Disclosure Bulletin, pp.5413–5416, May 1987.

*Primary Examiner*—Thomas C. Lee
*Assistant Examiner*—Po C. Huang
*Attorney, Agent, or Firm*—Wilson Sonsini Goodrich & Rosati

[57] ABSTRACT

A data transfer synchronizing unit is provided for generating flags indicating the fullness state of a data transfer element. The determining unit includes the first and second counters operating according to first and second clock signals, first and second registers, serially connected to the output of the second counter, a latch unit and a comparator. The first register is clocked by the second clock signal and the second register is clocked by the first clock signal. The latch unit alternately activates the first and second registers to receive data in accordance with the second and first clock signals, respectively. The comparator produces the flags by comparing the output of the first counter with the output of the second register.

8 Claims, 3 Drawing Sheets

SYNCHRONIZING UNIT HAVING TWO REGISTERS SERIALLY CONNECTED TO ONE CLOCKED ELEMENTS AND A LATCH UNIT FOR ALTERNATELY ACTIVATING THE REGISTERS IN ACCORDANCE TO CLOCK SIGNALS

FIELD OF THE INVENTION

The present invention relates generally to data transfer between two subsystems having different latencies, transfer rates and clock speeds and to synchronization of flags in such data transfer systems in particular.

BACKGROUND OF THE INVENTION

Computer systems are typically comprised of a plurality of subsystems operating at different clock speeds and different latencies. When one subsystem transfers data to a second subsystem, it is possible that the transfer rate of the two subsystems differ. In order for two such subsystems to communicate, some type of data transfer elements must be placed therebetween. For example, first-in, first-out (FIFO) buffers are placed between the two subsystems. The FIFO buffers receive the data from the transferring subsystem at its first transfer, clock and latency rates and provide the data to the receiving subsystem at its second transfer, clock and latency rates. Thus, the FIFO provides the two subsystems with the ability to communicate.

However, the two subsystems cannot continually fill the FIFO buffer; once the buffer is full, the faster subsystem has to stop sending data until the FIFO begins to empty out. Thus, the data transfer system has to measure the fullness of the FIFO. This is illustrated in FIG. 1, to which reference is now made.

FIG. 1 illustrates two subsystems 10 and 12, illustrated as busses, with a FIFO buffer 14 in between. System 10 operates according to clock B and system 12 operates according to clock A. The fullness determining unit 15 typically includes two wraparound counters, counter A and counter B, for counting the number of times data is transferred from subsystems 12 and to subsystem 10, respectively, and a fullness flag generator 16. The fullness flag generator 16 compares the values of counters A and B to the size of the FIFO 14 and activates a fullness flag whenever the values of counters A and B indicate that the FIFO 14 is full. Generator 16 can also indicate that the FIFO is empty and/or half-full.

For example, let the rate of clock A be 50Hz, the rate of clock B be 25Hz, the size of the FIFO buffer 14 be 100 bits long, the size of counter A be 200 and the size of counter B be 100. Also assume that subsystem 12, operating at clock A, is transferring the data to subsystem 10, operating at clock B. At an initial time, t=0, both counters A and B are at 0 and the FIFO buffer 14 is empty.

After one second, subsystem 12 will have performed 50 transfers into FIFO 14 and subsystem 10 will have performed 25 removals from FIFO buffer 14. The FIFO buffer 14 will contain 25 pieces of data. Counter A will have a value of 50 and counter B will have a value of 25. The process repeats and thus, after four seconds, subsystem 12 will have performed 200 transfers and subsystem 10 will have performed 100 removals. Counter A will have a value of 200 and counter B will have a value of 100. The FIFO buffer 14 will contain 100 pieces of data and will be completely full.

At this point, when fullness flag generator 16 compares the values of counters A and B, it will determine that they indicate that the FIFO buffer 14 is full. Generator 16 will activate the fullness flag which indicates to the transferring subsystem (in this case, system 12), to stop transferring. Counters B and A both wraparound to 0 and the above counting process is repeated until counter B reaches 100 (indicating that 100 removals have occurred). Counter A will not increment since subsystem 12 is not transferring anything.

At this point, generator 16 deactivates the fullness flag. Counter B will wraparound to 0 and both subsystems 10 and 12 can then operate as described previously.

Unfortunately, since the two subsystems operate at different clock rates which are not, necessarily, synchronized with each other, it is possible that the fullness flag generator 16 will sample the data in counters A and B just before one or the other of the counters is updated. Thus, generator 16 might make an incorrect decision. In order to ensure that fullness flag generator 16 operates properly, the latching of data from counters A and B have to be synchronized.

SUMMARY OF THE PRESENT INVENTION

It is therefore an object of the present invention to provide a fullness determining unit, for data transfer elements, which synchronizes the latching of data from two separately clocked counters.

In accordance with a preferred embodiment of the present invention, the fullness determining unit includes the first and second counters operating according to first and second clock signals, first and second registers, serially connected to the output of the second counter, a latch unit and a comparator. The first register is clocked by the second clock signal and the second register is clocked by the first clock signal. The latch unit alternately activates the first and second registers to receive data in accordance with the second and first clock signals, respectively. The comparator produces the flags by comparing the output of the first counter with the output of the second register.

Additionally, in accordance with a preferred embodiment of the present invention, the latch unit includes first and second latches and a token passer. The latches are only active when they receive the token. The first latch transfers the output of the second counter to the first register in accordance with the second clock signal. The second latch transfers the output of the first register to the second register in accordance with the first clock signal. The token passer passes the token back and forth between the first latch to the second latch.

Moreover, in accordance with a preferred embodiment of the present invention, the token passer includes at least one synchronizer operating in accordance with the first clock for passing the token from the first latch to the second latch and at least one synchronizer operating in accordance with the second clock for passing the token from the second latch to the first latch.

There is also provided, in accordance with a preferred embodiment of the present invention, a synchronizing unit for synchronizing the output of first and second separately clocked elements. The synchronizing unit includes first and second registers and a latch unit. The registers are serially connected to the output of the second clocked element, the first register is clocked by the second clock and the second register is clocked by the first clock. The second register provides the synchronized output. The latch unit alternately activates the first and second registers to receive data in accordance with the second and first clocks, respectively.

Since binary counters describe numbers with many bits (i.e. the number 15 is 0111), since incrementing by one can

3 cause many bits to change states (i.e. the value 16 is 1000) and since all of the bits do not, necessarily, change state at exactly the same time, if one is sampling the binary counter with a clock different from that which increments the binary counter, it is possible to sample the output of a binary counter during the change of state. This produces an incorrect reading of the contents of the binary counter. In contrast, grey level counters change only one bit when incrementing.

Therefore, in accordance with a second preferred embodiment of the present invention, the fullness determining unit includes a binary counter, a grey level counter, a synchronizer, a grey to binary converter and a comparator. The binary counter is incremented each time data is transferred into the data transfer element and operates in accordance with the first clock signal. The grey level counter is incremented each time data is removed from the data transfer element and operates in accordance with a second clock signal. The synchronizer operates in accordance with the first clock signal, and latches the output of the grey level counter. The grey to binary converter converts the output of the at least one synchronizer to a binary value. The comparator produces the flags by comparing the output of the first counter with the output of the grey to binary converter.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 2:
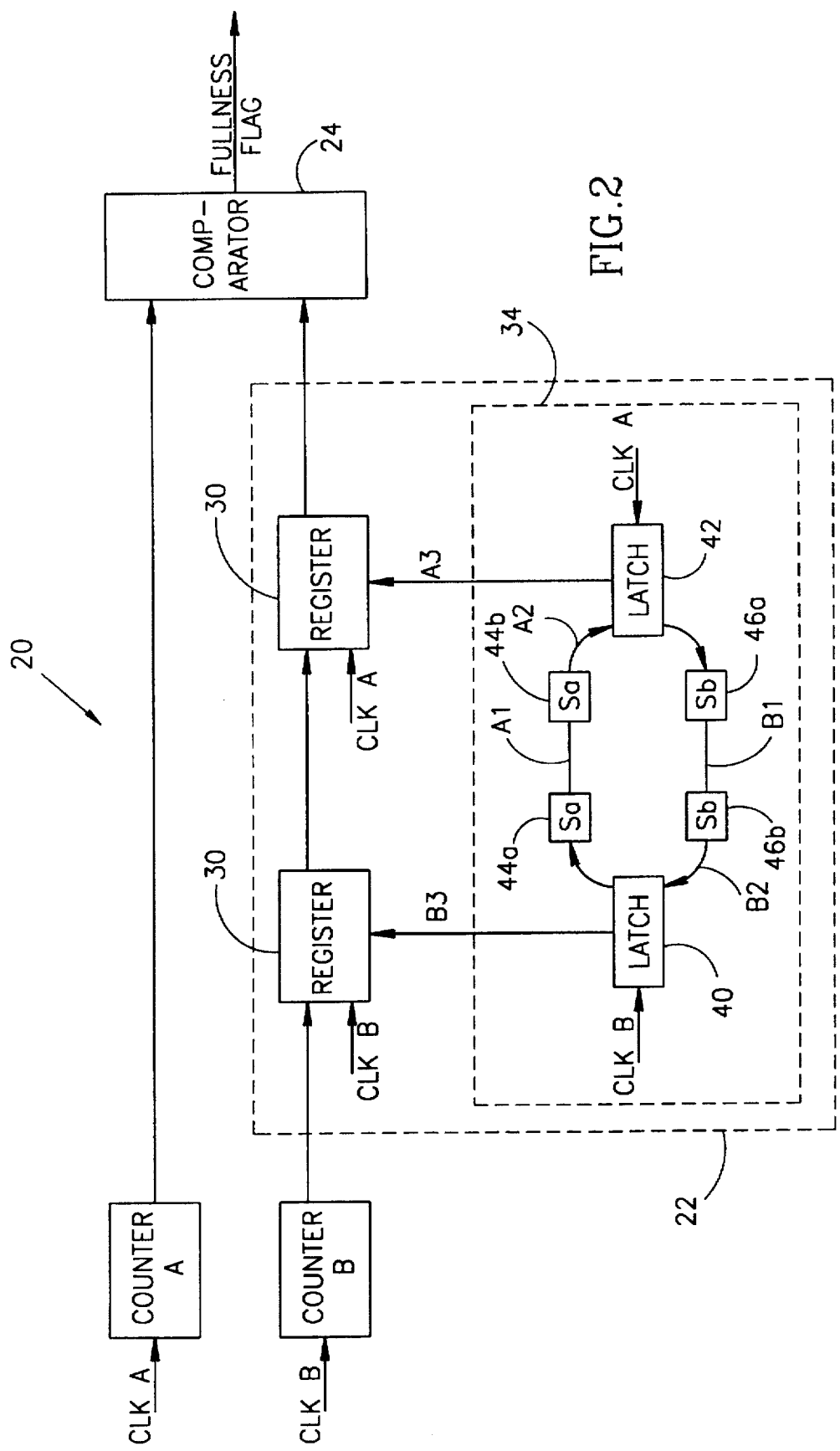
FIG. 2 is a schematic illustration of a fullness determining unit, constructed and operative in accordance with a first preferred embodiment of the present invention.
Figure 3:
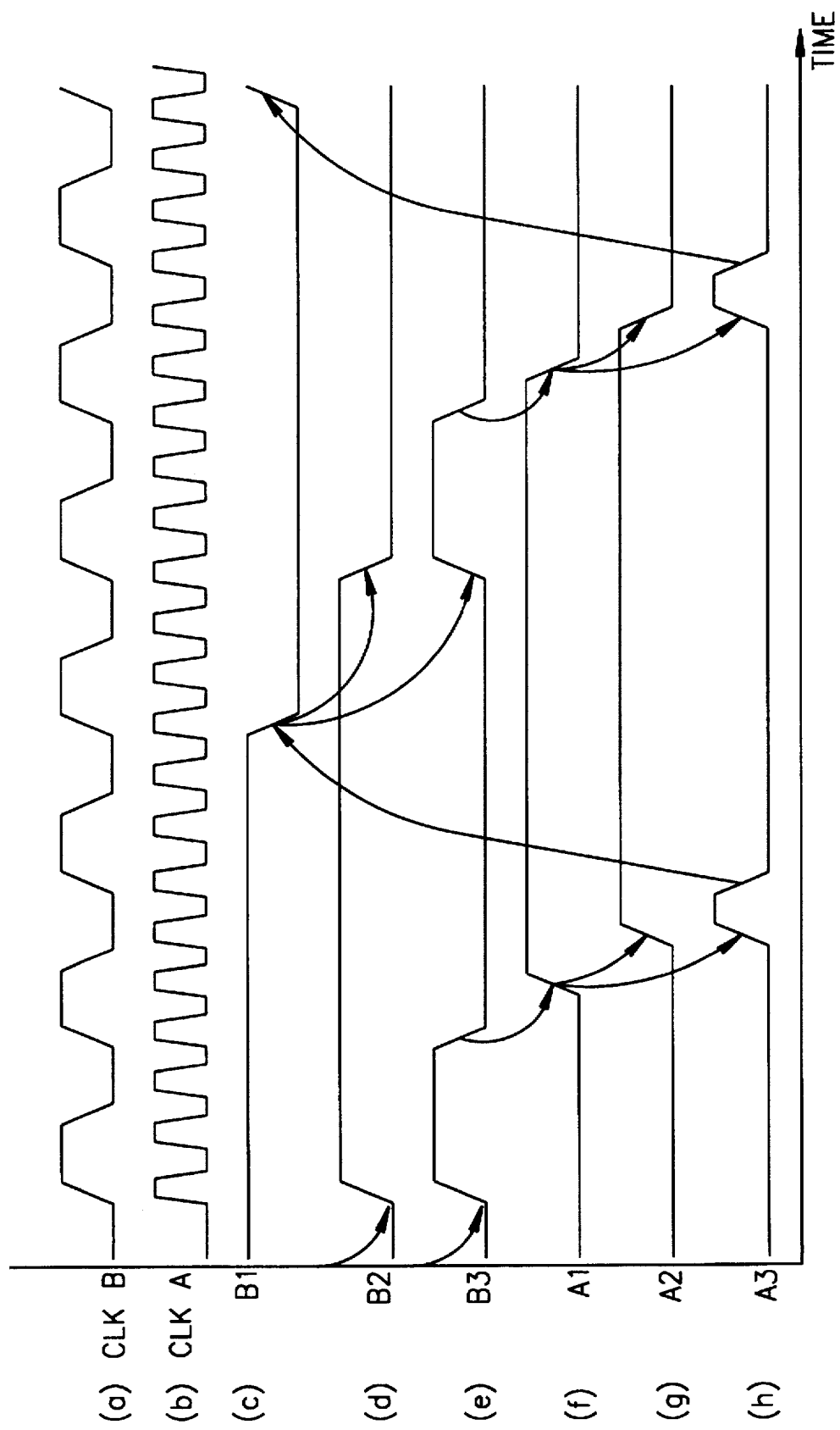
FIG. 3 is a timing diagram useful in understanding the operation of the unit of FIG. 2.

Reference is now made to FIGS. 2 and 3 which illustrate a fullness determining unit, constructed and operative in accordance with a first preferred embodiment of the present invention. The fullness determining unit, labeled 20, of the present invention comprises counters A and B, as in the prior art, a value latching unit 22, and a comparator 24.

It will be appreciated that the fullness determining unit 20 can operate with any type of data transfer element and that the FIFO 10 is provided herein as an example.

The counters A and B operate as in the prior art, counting the number of bits which their respective subsystems have transferred in or out. For the present discussion, counter A is associated with the transferring subsystem, such as subsystem 12, and counter B is associated with the receiving subsystem, such as subsystem 10.

Since counter A indicates the number of transfers into the FIFO buffer 14, comparator 24 operates on clock A and directly receives the output of counter A. The output of counter B, which might be changing at the moment that the value of counter A is being latched by comparator 24, is collected by the value latching unit 22 in accordance with clock B and is provided to comparator 24 in accordance with clock A.

4

Value latching unit 22 comprises two registers 30 and 32 and a switching unit 34. Register 30 latches the current value of counter B in accordance with clock B and register 32 latches the value in register 30 in accordance with clock A. Comparator 24 receives the value in register 32 in accordance with clock A.

To ensure that registers 30 and 32 do not latch data at the same time, switching unit 34 activates the two registers 30 and 32 alternatively. To do so, switch unit 34 comprises two latches 40 and 42, which activate registers 30 and 32, respectively, but only once they receive an internal "token" or "pulse". Since the token can exist in only one place at a time, registers 30 and 32 will be alternately activated.

Switch unit 34 comprises the two latches 40 and 42, two clock A synchronizers 44a and 44b and two clock B synchronizers 46a and 46b. The synchronizers 44 and 46 can be any suitable synchronizers such as are known in the art. Latch 40 operates on clock B and latch 42 operates on clock A.

The operation of switch unit 34 will now be described with respect to FIG. 3 which illustrates, in graphs (a)–(h), the activity levels respectively of clock B, clock A, signals B1–B3 and signals A1–A3, where signals B1–B3 and A1–A3 are marked on FIG. 2.

As shown in graph (e) of FIG. 3, latch 40 receives the token when clock B goes high. When latch 40 has the token, it activates register 30, via signal B3, to latch the value presently in counter B. The next time clock B goes high, latch 40 is deactivated and signal B3 goes low.

The next time that clock A goes high after signal B3 goes low, synchronizer 44a is activated (i.e. receives the token). Signal A1 changes state. The next time that clock A goes high, synchronizer 44b and latch 42 are activated (i.e. they both receive the token). Signal A2 changes state and signal A3 goes high.

Signal A3, from latch 42, activates register 42 which then latches the data from register 30. Latch 42 is deactivated the next time that clock A goes high (i.e. when signal A3 goes low) thereby providing the token to synchronizer 46a. On that same clock A high, the data from register 32 is provided to comparator 24.

The next time that clock B goes high, signal B1 of synchronizer 46a changes state. On the following clock B high, the token passes to synchronizer 46b and to latch 40. Signal B2 (of synchronizer 46b) changes state and signal B3 (of latch 40) goes high. The process as described hereinabove is repeated. Latch 40 activates register 40 and, the next time clock B goes high, latch 40 is deactivated and signal B3 goes low. The token passes to synchronizer 44a which changes state the next time clock A goes high.

Comparator 24 can perform any suitable comparison operations in order to produce flags indicating the fullness state of the FIFO buffer 14. The flags which comparator 24 produces are provided externally to start and stop the transfer operations of subsystems 10 and 12 and/or to perform other operations.

It will be appreciated that the switch unit 22 adds delay between counter B and comparator 24. However, since counter B counts the number of bits removed from the FIFO buffer 14 and provided to the receiving subsystem 10, the delay just delays the deassertion of a fullness flag; it slows the operation of the transfer but does not cause any data loss.

It will be further appreciated that the switch unit 22 can be implemented in any situation wherein it is necessary to synchronize the output of two differently clocked elements and that the present invention incorporates all such situations.

Figure 1:
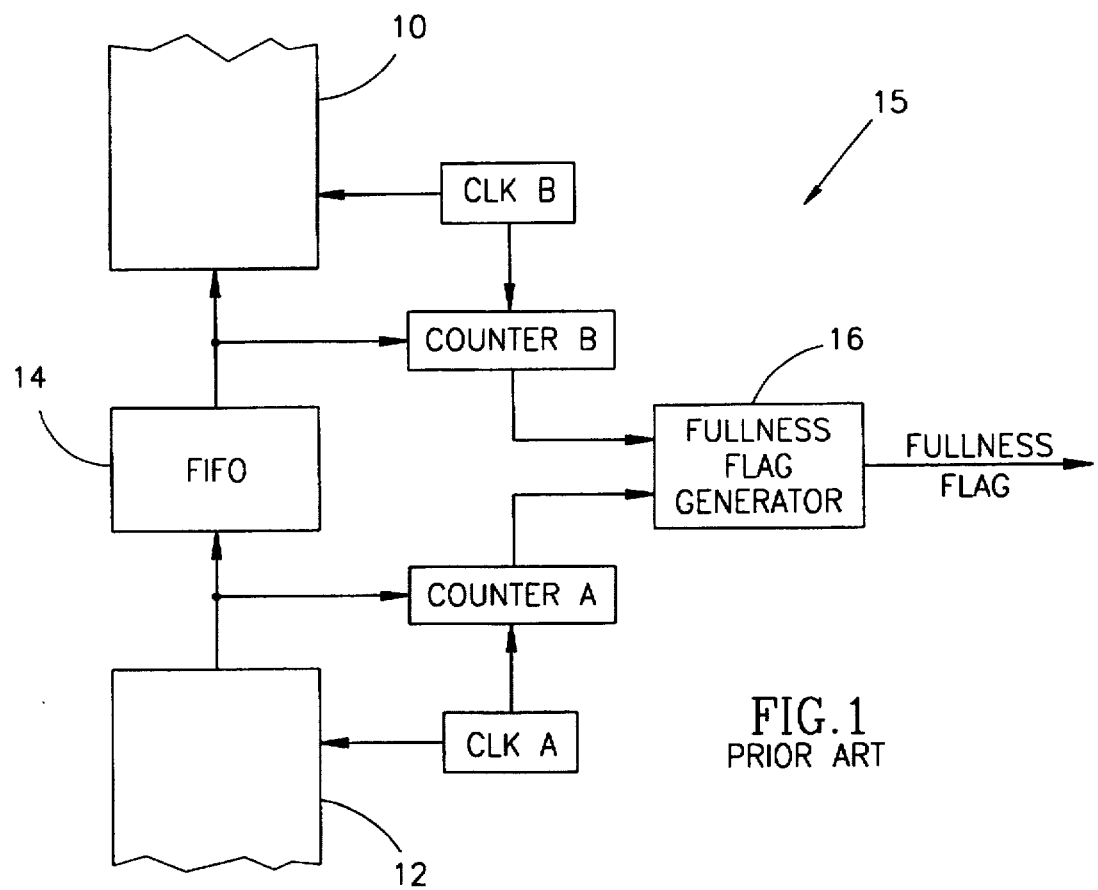
FIG. 1 is a schematic illustration of prior art data transfer between two subsystems utilizing a first-in, first-out (FIFO) buffer and a fullness determining unit.
Figure 4:
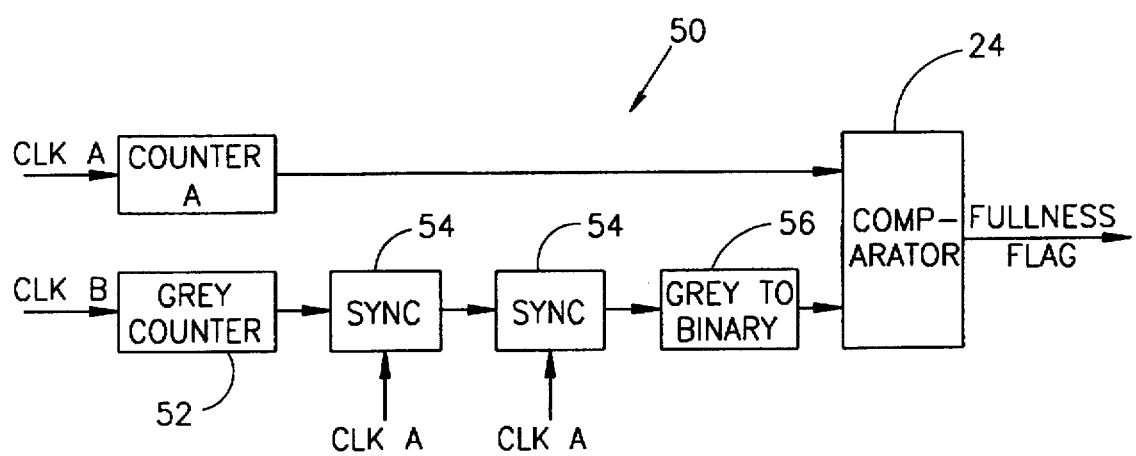
FIG. 4 is a schematic illustration of a fullness determining unit, constructed and operative in accordance with the present invention.

Reference is now made to FIG. 4 which illustrates a second embodiment of the fullness determining unit of the present invention.

Since binary counters describe numbers with many bits (i.e. the number 15 is 0111), since incrementing by one can cause many bits to change states (i.e. the value 16 is 1000) and since all of the bits do not, necessarily, change state at exactly the same time, if one is sampling the binary counter with a clock different from that which increments the binary counter, it is possible to sample the output of a binary counter during the change of state. This produces an incorrect reading of the contents of the binary counter. In contrast, grey level counters change only one bit when incrementing.

Therefore, in this embodiment, the fullness determining unit, labeled 50, comprises comparator 24, a binary counter, counter A, which is sampled at the same clock (clock A) as the comparator, and a grey level counter 52 which is clocked in accordance with clock B and whose output is synchronized to clock A. Unit 50 additionally comprises at least one synchronizer 54 and a grey to binary converter 56. FIG. 4 illustrates two synchronizers 54, utilized in order to ensure metastability of the output read from grey counter 52.

Since grey counter 52 only increments one bit per clock of clock B, on the next clock A high signal, when the synchronizer 54 latches the data from grey level counter 52, the grey level counter 52 will most probably have finished incrementing the appropriate one bit. To increase metastability, two synchronizers 54 can be utilized.

The output of the synchronizer or synchronizers 54 is converted to a binary value by unit 56 and the result, which represents the number of transfers out of the FIFO buffer 14, is compared as described hereinabove.

It will be appreciated by persons skilled in the art that the present invention is not limited to what has been particularly shown and described hereinabove. Rather the scope of the present invention is defined only by the claims which follow:

We claim:

1. A fullness determining unit for generating flags indicating the fullness state of a data transfer element, the unit comprising:
   a. a first counter incremented each time data is transferred into said data transfer element and operating in accordance with a first clock signal;
   b. a second counter incremented each time data is removed from said data transfer element and operating in accordance with a second clock signal;
   c. first and second registers, serially connected to the output of said second counter, said first register being clocked by said second clock signal and said second register being clocked by said first clock signal;
   d. a latch unit for alternately activating said first and second registers to receive data in accordance with said second and first clock signals, respectively; and
   e. a comparator for producing said flags by comparing the output of said first counter with the output of said second register.

2. A fullness determining unit according to claim 1 and wherein said latch unit comprises:

a. a first latch, active in the presence of a token, for transferring output of said second counter to said first register in accordance with said second clock signal;
   b. a second latch, active in the presence of said token, for transferring output of said first register to said second register in accordance with said first clock signal; and
   c. a token passer for passing said token back and forth between said first latch to said second latch.

3. A fullness determining unit according to claim 2 and wherein said token passer comprises at least one synchronizer operating in accordance with said first clock for passing said token from said first latch to said second latch and at least one synchronizer operating in accordance with said second clock for passing said token from said second latch to said first latch.

4. A fullness determining unit according to claim 1 and wherein said data transfer element is a first-in, first-out (FIFO) buffer.

5. A fullness determining unit for generating flags indicating the fullness state of a data transfer element, the unit comprising:
   a. a binary counter incremented each time data is transferred into said data transfer element and operating in accordance with a first clock signal;
   b. a grey level counter incremented each time data is removed from said data transfer element and operating in accordance with a second clock signal;
   c. at least one synchronizer, operating in accordance with said first clock signal, for latching the output of said grey level counter;
   d. a grey to binary converter for converting the output of said at least one synchronizer to a binary value; and
   e. a comparator for producing said flags by comparing the output of said first counter with the output of said grey to binary converter.

6. A fullness determining unit according to claim 5 and wherein said data transfer element is a FIFO buffer.

7. A synchronizing unit for synchronizing the output of first and second clocked elements, wherein the clocked elements are clocked in accordance with first and second clocks, respectively, the synchronizing unit comprising:
   a. first and second registers, serially connected to the output of said second clocked element, said first register being clocked by said second clock and said second register being clocked by said first clock, said second register providing the synchronized output; and
   b. a latch unit for alternately activating said first and second registers to receive data in accordance with said second and first clock signals, respectively.

8. A synchronizing unit according to claim 7 and wherein said latch unit comprises:
   a. a first latch, active in the presence of a token, for transferring output of said second counter to said first register in accordance with said second clock;
   b. a second latch, active in the presence of said token, for transferring output of said first register to said second register in accordance with said first clock; and
   c. a token passer for passing said token back and forth between said first latch to said second latch.

* * * * *